(12) United States Patent
Santeiro

(10) Patent No.: US 9,932,094 B1
(45) Date of Patent: Apr. 3, 2018

(54) DIVING EQUIPMENT ORGANIZING APPARATUS

(71) Applicant: Alfredo Santeiro, Miami Beach, FL (US)

(72) Inventor: Alfredo Santeiro, Miami Beach, FL (US)

( * ) Notice: Subject to any disclaimer, the term of this patent is extended or adjusted under 35 U.S.C. 154(b) by 0 days.

(21) Appl. No.: 15/271,576

(22) Filed: Sep. 21, 2016

(51) Int. Cl.
  B63B 25/00 (2006.01)
  A01K 97/10 (2006.01)
  B63C 11/02 (2006.01)

(52) U.S. Cl.
  CPC ............ *B63B 25/002* (2013.01); *A01K 97/10* (2013.01); *B63C 11/02* (2013.01); *B63C 2011/025* (2013.01)

(58) Field of Classification Search
  CPC ............ A01K 97/10; B63B 17/00; B60R 9/00
  USPC ......... 224/406, 551, 556, 558, 568; 114/364
  See application file for complete search history.

(56) References Cited

U.S. PATENT DOCUMENTS

| | | | |
|---|---|---|---|
| 4,729,394 A | 3/1988 | Timmes et al. | |
| 4,877,167 A | 10/1989 | McNemar | |
| 5,042,763 A * | 8/1991 | Wong ..................... | F16M 13/02 |
| | | | 224/265 |
| 5,083,692 A | 1/1992 | Treese | |
| 5,190,195 A * | 3/1993 | Fullhart .................... | B60R 9/10 |
| | | | 224/497 |
| 5,330,084 A * | 7/1994 | Peters ....................... | B60R 9/06 |
| | | | 211/171 |
| 5,373,978 A * | 12/1994 | Buttchen ................... | B60R 9/06 |
| | | | 224/510 |
| 5,527,146 A * | 6/1996 | Allsop, ..................... | B60R 9/06 |
| | | | 224/319 |
| 5,579,972 A * | 12/1996 | Despain .................... | B60R 9/06 |
| | | | 224/506 |
| 5,673,507 A * | 10/1997 | Stokes, Jr. ............ | A01K 97/10 |
| | | | 114/364 |
| 5,775,555 A * | 7/1998 | Bloemer ................ | B60R 9/048 |
| | | | 224/502 |
| 5,839,704 A * | 11/1998 | Appleman ............. | F16M 13/04 |
| | | | 224/584 |
| 5,901,890 A | 5/1999 | Stokes | |
| 5,996,870 A * | 12/1999 | Shaver ...................... | B60R 9/06 |
| | | | 224/324 |
| 6,454,145 B1 | 9/2002 | Russ | |
| 6,547,116 B2 * | 4/2003 | Anderson ................. | B60R 9/06 |
| | | | 224/506 |

(Continued)

FOREIGN PATENT DOCUMENTS

DE 4116578 A1 11/1992
WO 2006043134 A1 9/2007

*Primary Examiner* — Brian D Nash
(74) *Attorney, Agent, or Firm* — Albert Bordas, P.A.

(57) ABSTRACT

A diving equipment organizing apparatus having a housing assembly with a sidewall that extends from a top edge to an end. The end inserts into an aperture that typically serves as a rod holder of a watercraft. A frame assembly has a frame having at least one base connector. Further having a strap assembly, a basket, and at least one hook assembly. The housing assembly further has a hinge assembly having a lower connector, an upper connector, and an actuator. The actuator is rotated to unlock the hinge assembly to permit angling the upper connector to a desired angle with respect to the lower connector. The housing assembly defines a cavity and the end has at least one notch.

16 Claims, 3 Drawing Sheets

(56) References Cited

U.S. PATENT DOCUMENTS

| | | | |
|---|---|---|---|
| 6,554,171 B1* | 4/2003 | Ewing | B60R 9/06 |
| | | | 211/85.7 |
| 6,565,103 B2 | 5/2003 | Wilson | |
| 6,571,811 B2 | 6/2003 | Kabboush | |
| 7,370,599 B1* | 5/2008 | Berman | B63B 15/00 |
| | | | 114/364 |
| 7,942,429 B2 | 5/2011 | Hill | |
| 8,006,875 B2 | 8/2011 | Watson | |
| 8,434,654 B2* | 5/2013 | Smith | B63B 25/00 |
| | | | 224/406 |
| 8,936,182 B2 | 1/2015 | Grasso et al. | |
| 9,199,583 B2* | 12/2015 | Tressel | B60R 9/08 |
| 2002/0124873 A1 | 9/2002 | Kabboush | |
| 2006/0037986 A1* | 2/2006 | Wang | B60R 9/06 |
| | | | 224/521 |
| 2008/0061092 A1 | 8/2008 | Brownlow | |
| 2009/0289089 A1 | 11/2009 | Fullerton et al. | |
| 2010/0089955 A1 | 4/2010 | Watson | |
| 2010/0181357 A1* | 7/2010 | Christianson | B60R 9/06 |
| | | | 224/497 |
| 2013/0062383 A1* | 3/2013 | Jeli | B60R 9/10 |
| | | | 224/497 |

* cited by examiner

DIVING EQUIPMENT ORGANIZING APPARATUS

BACKGROUND OF THE INVENTION

1. Field of the Invention

The present invention relates to watercraft accessories equipment, and more particularly, to diving equipment organizing apparatuses.

2. Description of the Related Art

Applicant believes that one of the closest references corresponds to U.S. Patent Application Publication No. 20100089955 A1, published on Apr. 15, 2010 to Chad Michael Watson for a diver's compression trifold backpack. However, it differs from the present invention because Watson teaches a travel bag for organizing and compressing diving equipment generally taken by divers on diving vacations. The bag is a belt and shoulder strap supported trifold roll design made of a reinforced synthetic fiber that has no central cavity but rather, three panels with or without see through mesh to enclose pockets on the panels. The bag is washable and has no corrodible components thereon.

Applicant believes that another reference corresponds to U.S. Patent Application Publication No. 20090289089 A1, published on Nov. 26, 2009 to Larry W. Fullerton, et al. for a correlated magnetic harness and method for using the correlated magnetic harness. However, it differs from the present invention because Fullerton, et al. teaches a harness that uses correlated magnets to enable objects to be secured thereto and removed therefrom. Some examples of such a harness include a construction work harness, a soldier harness, an astronaut harness, and a scuba harness (e.g., buoyancy compensator). The scuba harness can have different types of objects secured thereto and removed therefrom such as a weight pouch, a utility pocket, a dive light (flash light), a camera, a scuba lanyard, a navigation board, a depth gauge, a spear gun, or military equipment.

Applicant believes that another reference corresponds to U.S. Patent Application Publication No. 20080061092 A1, published on Mar. 13, 2008 to George Phillip Brownlow for a holder for Scuba Diving Equipment. However, it differs from the present invention because Brownlow teaches a holder for scuba diving equipment. The holder is attachable to a backpack for a buoyancy compensation device, and includes a back sheet and a front sheet connected to the back sheet to define a pouch with an upper access opening. The holder includes an elastic member, which extends across an upper region of the front sheet so that the access opening is expandable during insertion of scuba diving equipment into the pouch and subsequently contractible to retain the scuba diving equipment within the pouch.

Applicant believes that another reference corresponds to U.S. Patent Application Publication No. 20020124873 A1, published on Sep. 12, 2002 to Theodore Kabboush for an equipment rinsing frame for self-contained underwater breathing apparatus. However, it differs from the present invention because Kabboush teaches a frame for rinsing scuba equipment that comprises a lower portion having a base, an external water connection, and a hose connection, lower vertical support members which also carry water to a middle portion having an article rinsing unit, equipment supporting arms, and a BCD rinsing unit, an upper portion being supported by a water carrying vertical support member and including a hanger unit for vertically suspending a body garment, and a water outlet having a nozzle that provides an oscillating spray pattern reaching the interior of the body garment.

Applicant believes that another reference corresponds to U.S. Pat. No. 8,936,182 B2 issued to Michael Grasso, et al. on Jan. 20, 2015 for an adaptable rack for aquatic transport of articles. However, it differs from the present invention because Grasso, et al. teaches an adaptable rack for aquatic transport of articles to increase storage capacity of a boat and to prevent scuffing and damaging of the deck of the boat. It comprises a mounting post for fitting inside a rocket launcher on a boat, a support bar positioned on a top surface of the mounting post, and a plurality of support arms extending from the support bar, the support arms for supporting the article during aquatic transport.

Applicant believes that another reference corresponds to U.S. Pat. No. 8,006,875 B2 issued to Chad Michael Watson on Aug. 30, 2011 for a transportable support system for dive equipment. However, it differs from the present invention because Watson teaches a transportable support system for underwater dive equipment. The support system can be employed with a "hands free" design via the use of a shoulder strap, or secured in a dive bag or suitcase for airline travel.

Applicant believes that another reference corresponds to U.S. Pat. No. 7,942,429 B2 issued to Stacie Hill on May 17, 2011 for an amphibious, submersible, streamlined transport device for scuba gear. However, it differs from the present invention because Hill teaches a device used in beach-entry scuba dives that both assists the diver to transport scuba tanks and other diving gear to and across the shoreline, and then accompanies the diver and gear underwater. The device holds at least one scuba tank and associated gear such as a buoyancy compensator (BCD), and has a pair of wheels whose rolling position enables the loaded device to be easily transported over natural terrains. Upon reaching, or while in the water, the wheels may be shifted from the "rolling position" into a streamlined, free-swim position. The means attaching the scuba gear and the scuba tank are operated to let the user don both scuba tank and gear and start their dive, taking the device along for the return cross-shore trip.

Applicant believes that another reference corresponds to U.S. Pat. No. 6,571,811 B2 issued to Theodore Kabboush on Jun. 3, 2003 for an equipment-rinsing frame for self-contained underwater breathing apparatus. However, it differs from the present invention because Kabboush teaches a frame for rinsing scuba equipment comprising a lower portion having a base, an external water connection, and a hose connection. Lower vertical support members carry water to a middle portion having an article-rinsing unit. Further comprising equipment supporting arms and a BCD rinsing unit. An upper portion being supported by a water-carrying vertical support member and including a hanger unit for vertically suspending a body garment, and a water outlet having a nozzle that provides an oscillating spray pattern reaching the interior of the body garment.

Applicant believes that another reference corresponds to U.S. Pat. No. 6,565,103 B2 issued to Scot Morgan Wilson on May 20, 2003 for a scuba tank caddy, having an optional gear drying rack and an optional portable shower, and its method of fabrication. However, it differs from the present invention because Wilson teaches a scuba tank caddy, comprising a gear drying rack and an optional portable shower, retractable wheels, telescoping shower head, tank-pressurizing freshwater shower, that is corrosion-resistant.

Applicant believes that another reference corresponds to U.S. Pat. No. 6,454,145 B1 issued to Charles S. Russ on Sep.

24, 2002 for a hanger for a flak vest. However, it differs from the present invention because Russ teaches a hanger for supporting and drying a flak vest. The hanger including an upper support, a lower support, and a vertical support connected therebetween. The upper support includes a cross-member portion and a hook portion extending upwardly therefrom. The vertical support includes an upper end connected to the cross-member, opposite the hook portion. The vertical support extends downwardly to an adjustable collar portion, and further downwardly terminating in a lower end. The lower end of the vertical support couples to the lower support at a base portion thereof. Retainers extend upwardly from the base portion on opposite sides of the vertical support so as to define retaining channels between the retainers and vertical support.

Applicant believes that another reference corresponds to U.S. Pat. No. 5,901,890 A issued to Donald R. Stokes on May 11, 1999 for a scuba gear rack for watercraft. However, it differs from the present invention because Stokes teaches a support rack for use on a watercraft to hold several scuba gear and other equipment such as dive tanks, lights, radar, spear guns and a dive flag. The rack including oppositely disposed base members and a bridge structure including opposite vertical portions each attached to and extending upward from a corresponding one of the base members, and a horizontally extending portion integral with upper end zones of the vertical portions. The opposite base members removably mount to the watercraft to support the bridge structure above the stern or gunwale. Mounting structures are provided on the base members and bridge structure for holding the gear on the rack.

Applicant believes that another reference corresponds to U.S. Pat. No. 5,083,692 A issued to Gregory A. Treese on Jan. 28, 1992 for a strap and carry system. However, it differs from the present invention because Treese teaches a strap and carry system for cradling and transporting flat and generally rectangular objects such as a body board. The system comprises three flexible loose straps secured to each other forming an adjustable flexible cradle, which can be folded for storage and held open with one hand so that an object such as a body board can be inserted and secured for carrying.

Applicant believes that another reference corresponds to U.S. Pat. No. 4,877,167 A issued to Glenn A. McNemar on Oct. 31, 1989 for a retention system for diver accessories. However, it differs from the present invention because McNemar teaches a retention system particularly adapted for use by divers. It includes at least one lanyard having first and second ends. Further includes a first clip having a hook for securing thereon an implement, such as a dive light, slate, knife, etc. Further includes a slidable fastener associated with the first clip for sliding movement between opened and closed positions in the latter of which the implement cannot be inadvertently dislodged from the hook. Further includes a second clip in the form of a loop having opposite ends between, which is sandwiched as an edge of a garment, such as a pocket edge of buoyancy control device (BCD). Further includes at least one fastener spanning the ends of the second clip and penetrating the garment edge to create a generally permanent connection between the second clip and the BCD pocket, and a releasable connector between the second clip and the second end of the lanyard, whereby the implement is positively and permanently secured to the BCD and can be retained in the pocket thereof yet by quickly manually releasing the releasable connector, the implement can be quickly removed from (or reconnected to) the second clip.

Applicant believes that another reference corresponds to U.S. Pat. No. 4,729,394 A issued to Daniel Timmes, et al. on Mar. 8, 1988 for a portable scuba equipment frame. However, it differs from the present invention because Timmes, et al. teaches a portable frame for holding and washing scuba equipment comprised of a lower rack structure designed to hold the equipment and a tubular spraying assembly detachably mounted over said structure. The modular arrangement of the frame allows for maintenance, transportation and storage of such equipment.

Applicant believes that another reference corresponds to WIPO Publication No. WO 2006043134 A1 published on Sep. 5, 2007 to George Phillip Brownlow on Sep. 5, 2007 for a holder for scuba diving equipment. However, it differs from the present invention because Brownlow teaches a holder for scuba diving equipment that is attachable to a backpack for a buoyancy compensation device, and includes a back sheet and a front sheet connected to the back sheet to define a pouch with an upper access opening. The holder includes an elastic member, which extends across an upper region of the front sheet so that the access opening is expandable during insertion of scuba diving equipment into the pouch and subsequently contractible to retain the scuba diving equipment within the pouch.

Applicant believes that another reference corresponds to German Patent No. DE 4116578 A1 issued to Dieter Mueller on Nov. 26, 1992 for an accessory or sack trolley to carry skin diving equipment. However, it differs from the present invention because Mueller teaches an accessory for use with a sack trolley, to carry and later to dry, skin diving equipment for sport. It consists of a frame with a storage container. The container has a built-in positioning lamp. The frame has rigid, foldable, lowerable suspension devices for diving equipment, and anchoring devices. The accessory also has fasteners for fastening to the sack trolley. The lamp may have a coloured insert, to ease identification. The container has a folding lid, and a padlock. Four round bars are mounted to the lid by hinges. They can be folded down, to allow drying of diving gloves and socks. Retractable bars to each end of the frame are locked together, to carry coat-hangers for the diving suit. There are eyes and straps to fix compressed air bottles, and hooks for flippers.

Other patents describing the closest subject matter provide for a number of more or less complicated features that fail to solve the problem in an efficient and economical way. None of these patents suggest the novel features of the present invention.

SUMMARY OF THE INVENTION

The present invention is a diving equipment organizing apparatus, comprising a housing assembly having a sidewall that extends from a top edge to an end. The end inserts into an aperture that typically serves as a rod holder of a watercraft. A frame assembly comprises a frame having at least one base connector. Further comprising a strap assembly, a basket, and at least one hook assembly.

The housing assembly further comprises a hinge assembly. The hinge assembly comprises a lower connector, an upper connector, and an actuator. The actuator is rotated to unlock the hinge assembly to permit angling the upper connector to a desired angle with respect to the lower connector. The housing assembly defines a cavity. The end has at least one notch.

The frame assembly extends approximately perpendicularly from the sidewall. Extending from the frame is the at least one base connector comprising a first elbow. The at least one base connector further comprises a middle connector that extends from the first elbow. The at least one base connector further comprises a second elbow that extends from the middle connector. The at least one base connector further comprises a post that extends from the second elbow. The at least one base connector further comprises a tapered section that extends from the post. The at least one base connector further comprises a tapered end that extends from the tapered section. The first and second elbows each form an approximate 90 degree angle in a preferred embodiment.

The strap assembly is secured to the sidewall and comprises a fastener. The basket is also mounted to the sidewall and comprises sides, an edge, and a base. In addition, the at least one hook assembly extends approximately perpendicularly from the sidewall and comprises a shaft with a hook having a hook end. Further comprising at least one eye bolt that also extends from the sidewall.

It is therefore one of the main objects of the present invention to provide a diving equipment organizing apparatus.

It is another object of this invention to provide a diving equipment organizing apparatus that inserts into an aperture that typically serves as a rod holder of a watercraft.

It is another object of this invention to provide a diving equipment organizing apparatus comprising a frame assembly to secure fins.

It is another object of this invention to provide a diving equipment organizing apparatus comprising hook assemblies to secure masks, snorkels, slings, etc.

It is another object of this invention to provide a diving equipment organizing apparatus comprising a basket to secure containers, anti-fog drops, eye drops, spear tips, and/or miscellaneous items.

It is another object of this invention to provide a diving equipment organizing apparatus comprising a strap assembly to secure spear guns, poles, fins, spears, or any other suitable diving and fishing gear.

It is another object of this invention to provide a diving equipment organizing apparatus comprising eyebolts for ropes, cords, bungee cords, etc. to further secure diving equipment and/or gear.

It is another object of this invention to provide a diving equipment organizing apparatus comprising a cavity to house spears and/or elongated objects.

It is another object of this invention to provide a diving equipment organizing apparatus that is volumetrically efficient for carrying, transporting, and storage.

It is another object of this invention to provide a diving equipment organizing apparatus that can be readily assembled and disassembled without the need of any special tools.

It is another object of this invention to provide a diving equipment organizing apparatus, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED

Embodiment

Figures 1, 2:
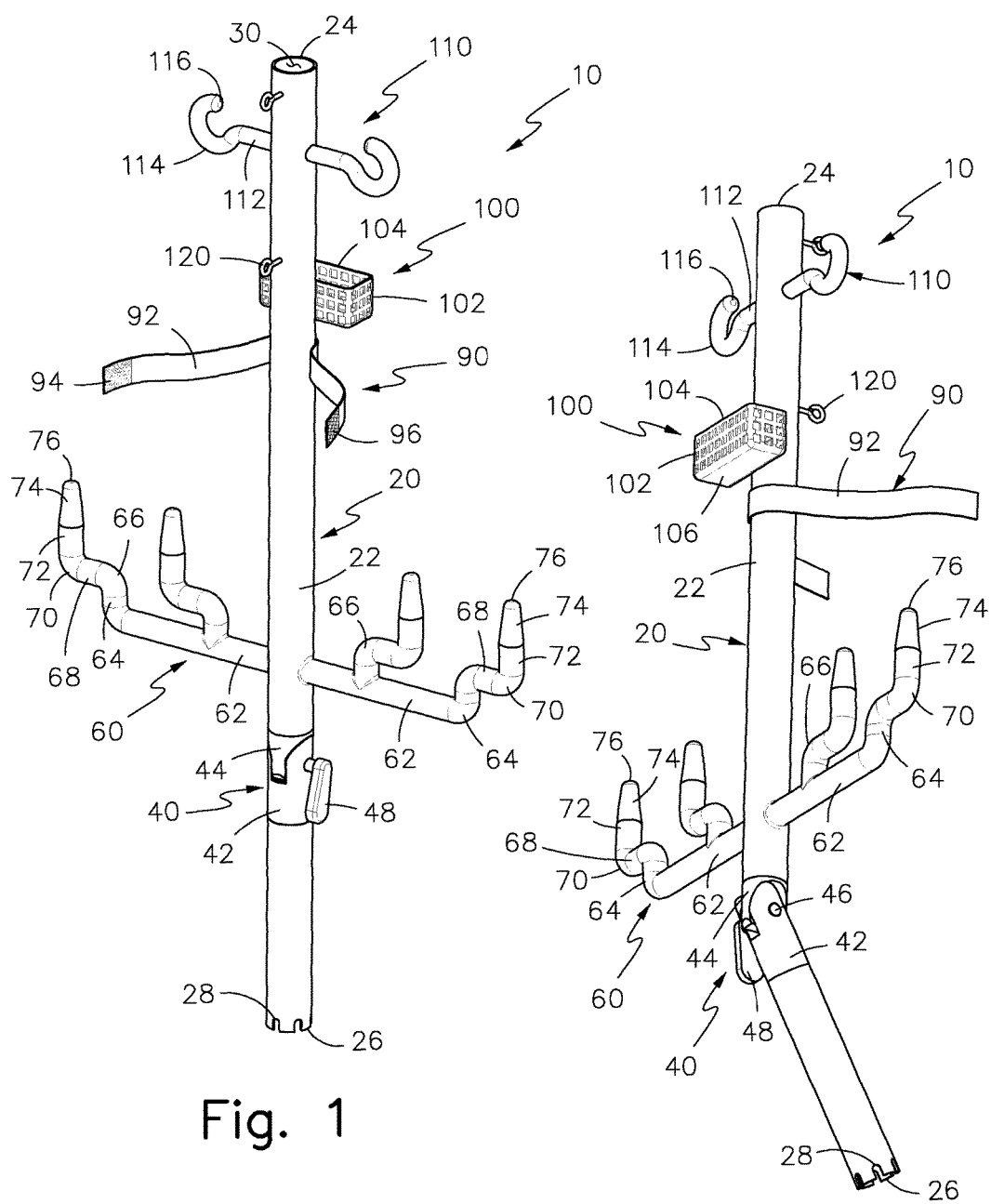
FIG. 1 represents an isometric view of the present invention in a straight configuration.
FIG. 2 represents an isometric view of the present invention in an angled configuration.

Referring now to the drawings, the present invention is a diving equipment organizing apparatus and is generally referred to with numeral 10. It can be observed that it basically includes housing assembly 20, hinge assembly 40, frame assembly 60, strap assembly 90, basket 100, and hook assemblies 110.

As seen in FIG. 1, housing assembly 20 comprises sidewall 22 that extends from top edge 24 to end 26, and defines cavity 30. End 26 has at least one notch 28. In a preferred embodiment, housing assembly 20 further comprises hinge assembly 40 that is at a first predetermined distance from the end 26. Hinge assembly 40 comprises lower connector 42, upper connector 44, pin 46, and actuator 48. In the present illustration, hinge assembly 40 is in a straight configuration, whereby lower connector 42 and upper connector 44 are on a same axis.

Housing assembly 20 further comprises frame assembly 60 that is at a second predetermined distance from the end 26. In a preferred embodiment, frame assembly 60 extends approximately perpendicularly from sidewall 22. Frame assembly 60 comprises frame 62. Extending upwardly from frame 62 is at least one base connector 64. Each base connector 64 has elbow 66, middle connector 68, elbow 70, post 72, tapered section 74 and tapered end 76. In a preferred embodiment, elbows 66 and 70 form an approximate 90-degree angle. It is noted that the second predetermined distance is greater than the first predetermined distance.

As seen in FIGS. 1 and 2, housing assembly 20 further comprises strap assembly 90 that is at a third predetermined distance from the end 26. Strap assembly 90 is secured to sidewall 22. Strap assembly 90 comprises strap 92 having a fastener. Such a fastener may be a hook and loop fastener comprising loop section 94 and hook section 96. It is noted that the third predetermined distance is greater than the second predetermined distance.

Housing assembly 20 further comprises basket 100 that is at a fourth predetermined distance from the end 26. Basket 100 is also mounted to sidewall 22. Basket 100 comprises sides 102, edge 104, and base 106. It is noted that the fourth predetermined distance is greater than the third predetermined distance.

Housing assembly 20 further comprises hook assemblies 110 that are at a fifth predetermined distance from the end 26. In a preferred embodiment, hook assemblies 110 extend approximately perpendicularly from sidewall 22. Each hook assembly 110 comprises shaft 112 with hook 114 having hook end 116. It is noted that the fifth predetermined distance is greater than the fourth predetermined distance.

Housing assembly 20 further comprises at least one eye bolt 120 that extends from sidewall 22.

As seen in FIG. 2, hinge assembly 40 is in an angled configuration, whereby lower connector 42 and upper connector 44 are not on a same axis. Actuator 48 is rotated to unlock hinge assembly 40 to permit angling upper connector 44 to a desired angle with respect to lower connector 42, and then locked.

Figure 3:
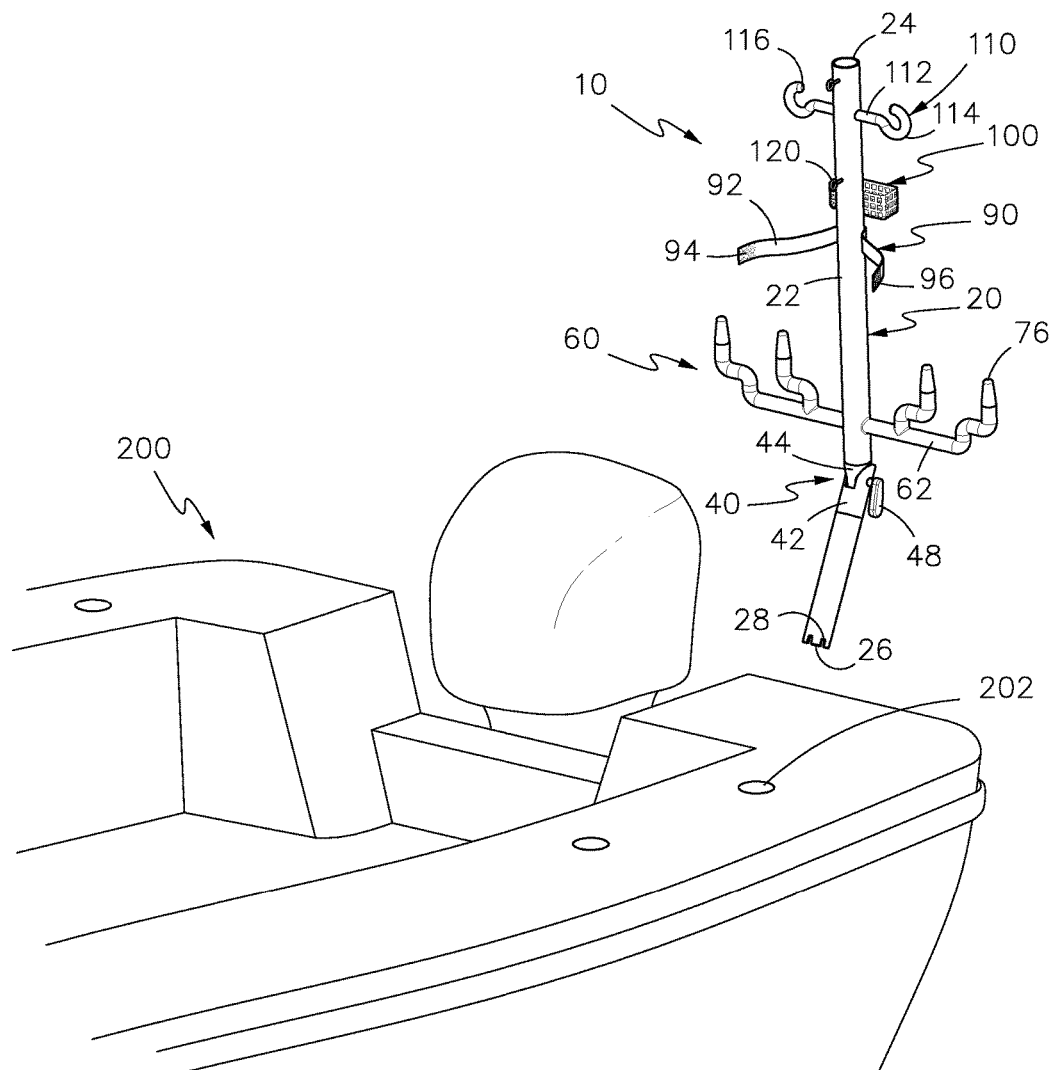
FIG. 3 represents an isometric view of the present invention in the angled configuration and being installed onto a watercraft.

As seen in FIG. 3, watercraft 200 comprises at least one aperture 202 that typically serves as a fishing rod holder. Aperture 202 may be vertically oriented, or angled. Present invention 10 is illustrated in the angled configuration and being installed onto watercraft 200, whereby aperture 202 receives end 26.

Figure 4:
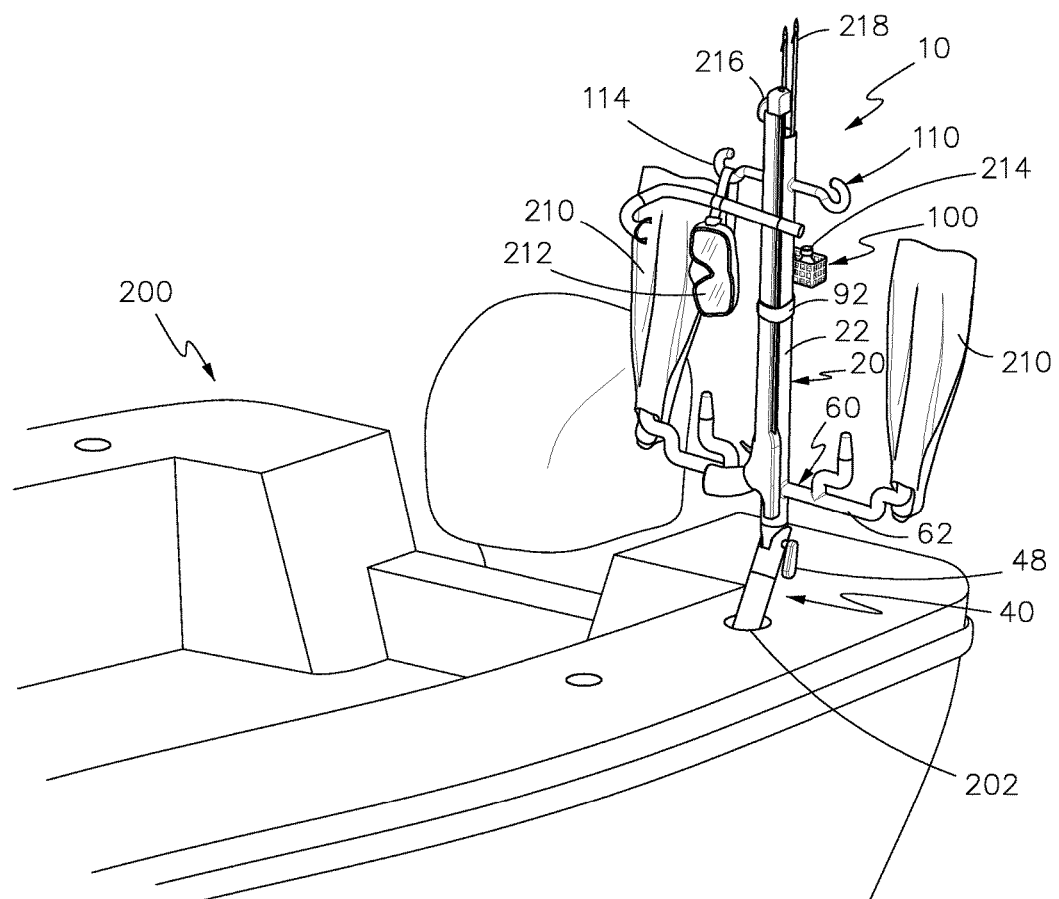
FIG. 4 represents an isometric view of the present invention in the angled configuration and installed onto the watercraft, with diving equipment secured thereon.

As seen in FIG. 4, present invention 10 is in the angled configuration and installed onto watercraft 200, with diving equipment and/or gear secured thereon. As an example, diving equipment and/or gear may include, but is not limited to, fins 210, mask 212, container 214, spear gun 216, and spears 218.

Fins 210 are secured onto frame assembly 60, whereby each fin 210 is placed over a respective tapered end 76. In one embodiment, an interior heel section wall of fin 210 is accommodated over elbow 70 and onto middle connector 68. In one embodiment, middle connector 68, elbow 70, post 72, tapered section 74 and tapered end 76 is shaped like a human foot to snugly receive fin 210.

One or more masks 212, snorkels, slings, etc. are secured onto hook assembly 110.

One or more containers 214 may be placed within basket 100. Container 214 may contain anti-fog drops, eye drops, spear tips, and/or miscellaneous items.

One or more spear guns 216 are secured to sidewall 22 with strap assembly 90. Strap assembly 90 may also secure poles, fins 210, spears 218, or any other suitable diving and/or fishing gear. Although not illustrated, it is noted that ropes, cords, bungee cords, etc. may be tied to eyebolts 120 to further secure the diving equipment and/or gear.

One or more spears 218 are inserted over top edge 24 and contained within cavity 30 of housing assembly 20.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A diving equipment organizing apparatus, comprising:
   A) a housing assembly comprising a sidewall that extends from a top edge to an end;
   B) a frame assembly comprising a frame having at least one base connector, extending from said frame is said at least one base connector comprising a first elbow, said at least one base connector further comprises a middle connector that extends from said first elbow, said at least one base connector further comprises a second elbow that extends from said middle connector, said at least one base connector further comprises a post that extends from said second elbow;
   C) a strap assembly;
   D) a basket; and
   E) at least one hook assembly.

2. The diving equipment organizing apparatus set forth in claim 1, further characterized in that said housing assembly further comprises a hinge assembly.

3. The diving equipment organizing apparatus set forth in claim 2, further characterized in that said hinge assembly comprises a lower connector, an upper connector, and an actuator.

4. The diving equipment organizing apparatus set forth in claim 3, further characterized in that said actuator is rotated to unlock said hinge assembly to permit angling said upper connector to a desired angle with respect to said lower connector.

5. The diving equipment organizing apparatus set forth in claim 1, further characterized in that said housing assembly defines a cavity.

6. The diving equipment organizing apparatus set forth in claim 1, further characterized in that said end has at least one notch.

7. The diving equipment organizing apparatus set forth in claim 1, further characterized in that said frame assembly extends approximately perpendicularly from said sidewall.

8. The diving equipment organizing apparatus set forth in claim 1, further characterized in that said at least one base connector further comprises a tapered section that extends from said post.

9. The diving equipment organizing apparatus set forth in claim 8, further characterized in that said at least one base connector further comprises a tapered end that extends from said tapered section.

10. The diving equipment organizing apparatus set forth in claim 1, further characterized in that said first and second elbows each form an approximate 90-degree angle.

11. The diving equipment organizing apparatus set forth in claim 1, further characterized in that said strap assembly is secured to said sidewall and comprises a fastener.

12. The diving equipment organizing apparatus set forth in claim 1, further characterized in that said basket is mounted to said sidewall and comprises sides, an edge, and a base.

13. The diving equipment organizing apparatus set forth in claim 1, further characterized in that said at least one hook assembly extends approximately perpendicularly from said sidewall and comprises a shaft with a hook having a hook end.

14. The diving equipment organizing apparatus set forth in claim 1, further comprising at least one eye bolt that extends from said sidewall.

15. The diving equipment organizing apparatus set forth in claim 1, further characterized in that said end is inserted into an aperture of a watercraft.

16. The diving equipment organizing apparatus set forth in claim 15, further characterized in that said aperture is a fishing rod holder.

* * * * *